United States Patent
Lee et al.

(10) Patent No.: US 11,735,094 B2
(45) Date of Patent: Aug. 22, 2023

(54) DISPLAY DEVICE

(71) Applicant: LG ELECTRONICS INC., Seoul (KR)

(72) Inventors: Kyungryun Lee, Seoul (KR); Miyeon Kwon, Seoul (KR); Seongwoon Seol, Seoul (KR); Sangjin Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 102 days.

(21) Appl. No.: 17/413,291

(22) PCT Filed: Jun. 27, 2019

(86) PCT No.: PCT/KR2019/007772
§ 371 (c)(1),
(2) Date: Jun. 11, 2021

(87) PCT Pub. No.: WO2020/262732
PCT Pub. Date: Dec. 30, 2020

(65) Prior Publication Data
US 2022/0020314 A1      Jan. 20, 2022

(51) Int. Cl.
*G09G 3/20*      (2006.01)
*H04N 21/41*     (2011.01)

(52) U.S. Cl.
CPC ..... *G09G 3/2096* (2013.01); *G09G 2320/103* (2013.01); *G09G 2340/12* (2013.01);
(Continued)

(58) Field of Classification Search
CPC ............... G09G 3/2096; G09G 5/006; G09G 2320/103; G09G 2340/12; G09G 2370/02;
(Continued)

(56) References Cited

U.S. PATENT DOCUMENTS

| 2013/0088332 A1* | 4/2013 | Park ................ H04N 21/8186 340/10.1 |
| 2015/0067729 A1* | 3/2015 | Yoon ............... H04N 21/43615 725/37 |

(Continued)

FOREIGN PATENT DOCUMENTS

| KR | 1020060064935 | 6/2006 |
| KR | 1020080066379 | 7/2008 |

(Continued)

OTHER PUBLICATIONS

PCT International Application No. PCT/KR2019/007772, International Search Report dated Apr. 29, 2020, 4 pages.

*Primary Examiner* — Brent D Castiaux

(74) *Attorney, Agent, or Firm* — Lee, Hong, Degerman, Kang & Waimey PC

(57) ABSTRACT

The objective of the present invention is to provides a display device for automatically recognizing an external device connected to external input terminals, the display device receiving pieces of control information about external devices connected to the same Internet, and then sensing whether a change in the output images occurs during the transmission of a control signal by using the pieces of received control information, while sequentially outputting images received from the external input terminals, thereby recognizing the external device connected to the input terminals.

11 Claims, 14 Drawing Sheets

(52) U.S. Cl.
CPC ..... *G09G 2370/02* (2013.01); *G09G 2370/06* (2013.01); *G09G 2370/16* (2013.01); *G09G 2370/22* (2013.01); *H04N 21/4104* (2013.01)

(58) Field of Classification Search
CPC ........... G09G 2370/06; G09G 2370/16; G09G 2370/22; H04N 21/4104; H04N 21/43615; H04N 21/43635; H04N 21/44227
See application file for complete search history.

(56) References Cited

U.S. PATENT DOCUMENTS

| | | |
|---|---|---|
| 2016/0100223 A1 | 4/2016 | Fan et al. |
| 2017/0195609 A1* | 7/2017 | Kim ..................... G06F 3/0346 |

FOREIGN PATENT DOCUMENTS

| | | |
|---|---|---|
| KR | 1020170081953 | 7/2017 |
| KR | 101834066 | 3/2018 |

* cited by examiner

DISPLAY DEVICE

CROSS-REFERENCE TO RELATED APPLICATIONS

This application is the National Stage filing under 35 U.S.C. 371 of International Application No. PCT/KR2019/007772, filed on Jun. 27, 2019, the contents of which are hereby incorporated by reference herein its entirety.

TECHNICAL FIELD

The present disclosure relates to a display device, and more particularly, to a display device for recognizing an external input terminal to which an external device is connected.

BACKGROUND ART

Recently, a digital TV service using a wired or wireless communication network has come into wide use. The digital TV service may provide various services which cannot be provided by an existing analog broadcast service.

For example, an Internet protocol television (IPTV) service or a smart TV service which is a digital TV service provides interactivity for enabling a user to actively select a type of a program to be viewed, a viewing time, etc. The IPTV service or the smart TV service may provide various additional services, e.g., Internet search, home shopping, online games, etc. based on such interactivity.

OTT (Over The Top) is one of the TV services described above, and is an Internet-based content providing service. OTT can provide content such as broadcast shows and movies to TV using the Internet.

In order to provide OTT, an external device such as a set top box to a display device is generally connected to a display device. The set-top box is a transmission/reception device for digital broadcasting, and is equipment capable of receiving an image signal and outputting it to a display device. The display device may be connected to an external device such as a set-top box, and may include an external input terminal for receiving an image from the external device.

Meanwhile, the display device may include a plurality of external input terminals, and various types of external devices of different manufacturers and versions may be respectively connected to the external input terminals. Since the display device needs to know control information of the external device to control the external device, the display device needs to perform an operation of recognizing the type of the external device connected to the external input terminal.

Conventional display devices manually input the type of external device from a user in order to recognize the type of external device connected to the external input terminal. In this case, whenever an external input is switched, the user is asked for the type of the external device, causing inconvenience to the user. In addition, when the user incorrectly inputs the type of the external device, a problem may occur in that the display device does not normally control the external device even though the display device and the external device are physically connected.

Accordingly, there is a need for a method by which the display device more accurately and automatically recognizes a type of an external device connected to an external input terminal.

DISCLOSURE

Technical Problem

An object of the present disclosure is to provide a display device capable of more accurately and automatically recognizing a type of an external device connected to an external input terminal.

An object of the present disclosure is to provide a display device capable of recognizing which external input terminal an external device is connected to when an external device is connected to one of a plurality of external input terminals.

An object of present disclosure is to provide a display device capable of minimizing user inconvenience when recognizing a type of an external device connected to an external input terminal.

Technical Solution

According to an embodiment, a display device may include an external device interface including one or more external input terminals connected to an external device, a storage configured to store different control information according to types of external devices, a display configured to display an image received through one of the external input terminals, and a controller configured to transmit a control signal to an external device based on the control information and recognize an external device connected to the external input terminal as a device corresponding to the control information when a change in the image due to the control signal is detected.

The display device further include a network interface connected to a router and the controller may search for a peripheral external device through the router, and recognize at least one of peripheral external devices as an external device connected to the external input terminal.

The controller may extract an external device connectable to the display device among the peripheral external devices, and recognize at least one of the extracted external devices as an external device connected to the external input terminal.

The external device connectable to the display device may include an electronic device connectable to the display device through the external input terminal.

The controller may control the network interface to receive control information for remotely controlling an external device connected to the external terminal from the outside.

The display device may include a plurality of external input terminals, the storage stores a plurality of control information, and the controller may output an image received through a first external input terminal among the plurality of external input terminals, transmit a first control signal based on first control information among the plurality of control information to an external device, and when a change in the output image is detected by the first control signal, recognize the external device connected to the first external input terminal as a first external device corresponding to the first control information.

The controller may transmit a second control signal based on second control information to an external device when the change in the output image is not detected by the first control signal, and recognize an external device connected to the first external input terminal as a second external device corresponding to the second control information when a change in the output image is detected by the second control signal.

The controller may recognize an external device connected to the first external input terminal as the first external device corresponding to first control information, output an image received through a second external input terminal among the plurality of external input terminals, transmit a second control signal based on second control information among the plurality of control information to an external device, and when a change in the output image is detected by the second control signal, recognize the external device connected to the second external input terminal as a second external device corresponding to the second control information.

The controller may display a preset guide image by overlapping with an image received from the external device when detecting a change in the image.

The control signal may include at least one of a channel up/down command, a number key input command, a menu key input command, and a direction key input command.

The storage may store different image change patterns according to a type of the external device, and the controller may sequentially transmit two or more control signals, and then recognize an external device connected to the external device interface by comparing an image change according to each of the control signals with the image change pattern.

The display device may further include an infrared blaster configured to transmit the control signal to an external device.

The controller may transmit the control signal to the external device through an Internet network.

The storage may store external device mapping information that maps an external input terminal to an external device connected to the external input terminal.

The controller may generate a control signal using control information of an external device mapped to the external input terminal to which the image is input when receiving a user command after performing mapping of the external device connected to the external input terminal.

Advantageous Effects

According to an embodiment of the present disclosure, the type of the external device connected to the external input terminal can be automatically recognized, thus minimizing the inconvenience to request a user of a separate input.

In addition, since the type of external device connected to the external personnel terminal is automatically recognized, it is possible to minimize a case of incorrectly receiving the type of the external device from the user, thereby increasing product reliability and improving recognition accuracy.

In addition, when acquiring whether or not the image is changed to recognize the type of the external device, the image change is detected only for the type of the peripheral external device found through a router rather than the types of all external devices, thus minimizing a time required to recognize the type of the external device.

In addition, there is an advantage of minimizing user confusion due to a sudden change of image by outputting a preset guide image when acquiring whether or not an image change is acquired to recognize the type of an external device.

MODE FOR INVENTION

Hereinafter, embodiments relating to the present disclosure will be described in detail with reference to the accompanying drawings. The suffixes "module" and "interface" for components used in the description below are assigned or mixed in consideration of easiness in writing the specification and do not have distinctive meanings or roles by themselves.

Figure 1:
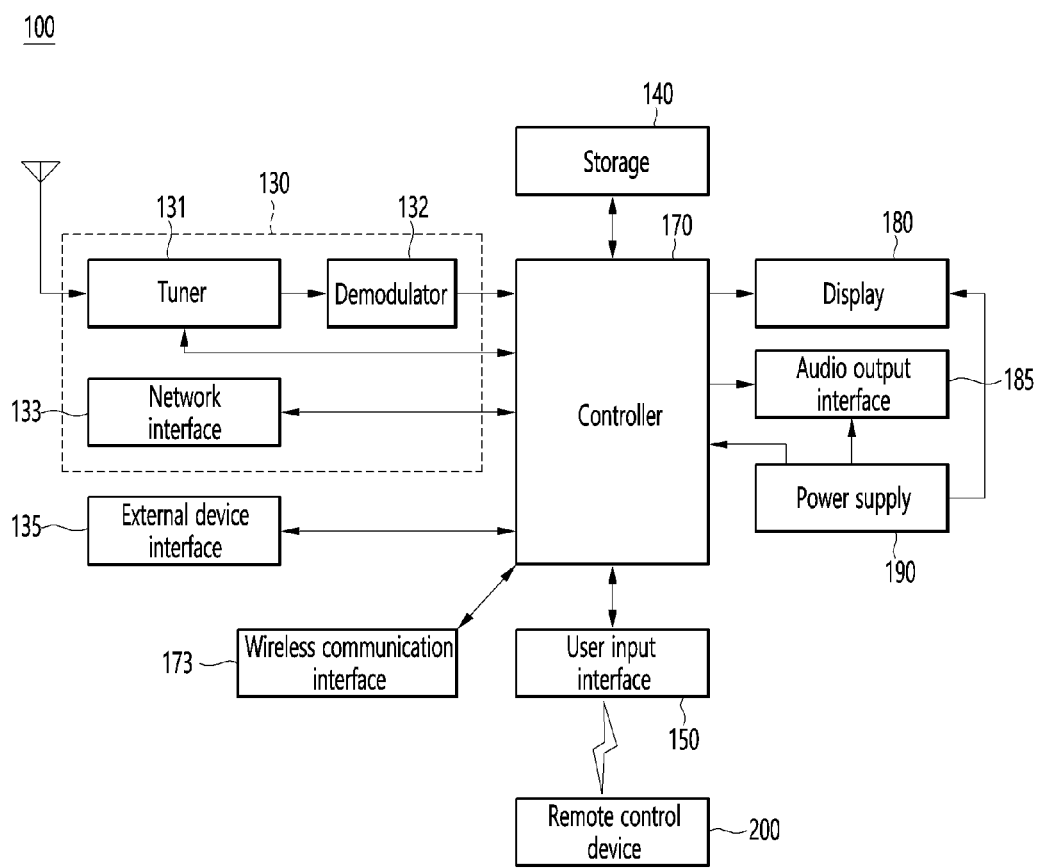
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception module 130, an external device interface 135, a storage 140, a user input interface 150, a controller 170, a voice acquisition module 175, a display 180, an audio output interface 185, and a power supply 190.

The broadcast reception module 130 can include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program related data signals and restore the divided video signals, audio signals, and data signals to an output available form.

The network interface 133 can provide an interface for connecting the display device 100 to a wired/wireless network including internet network. The network interface 133 can transmit or receive data to or from another user or another electronic device through an accessed network or another network linked to the accessed network.

The network interface 133 can access a predetermined webpage through an accessed network or another network linked to the accessed network. That is, it can transmit or receive data to or from a corresponding server by accessing a predetermined webpage through network.

Then, the network interface 133 can receive contents or data provided from a content provider or a network operator. That is, the network interface 133 can receive contents such as movies, advertisements, games, VODs, and broadcast signals, which are provided from a content provider or a network provider, through network and information relating thereto.

Additionally, the network interface 133 can receive firmware update information and update files provided from a network operator and transmit data to an internet or content provider or a network operator.

The network interface 133 can select and receive a desired application among applications open to the air, through network.

The external device interface 135 can receive an application or an application list in an adjacent external device and deliver it to the controller 170 or the storage 140.

The external device interface 135 can provide a connection path between the display device 100 and an external device. The external device interface 135 can receive at least one of image and audio outputted from an external device that is wirelessly or wiredly connected to the display device 100 and deliver it to the controller. The external device interface 135 can include a plurality of external input terminals. The plurality of external input terminals can include an RGB terminal, at least one High Definition Multimedia Interface (HDMI) terminal, and a component terminal.

An image signal of an external device inputted through the external device interface 135 can be outputted through the display 180. A sound signal of an external device inputted through the external device interface 135 can be outputted through the audio output interface 185.

An external device connectable to the external device interface 135 can be one of a set-top box, a Blu-ray player, a DVD player, a game console, a sound bar, a smartphone, a PC, a USB Memory, and a home theater system but this is just exemplary.

Additionally, some content data stored in the display device 100 can be transmitted to a user or an electronic device, which is selected from other users or other electronic devices pre-registered in the display device 100.

The storage 140 can store signal-processed image, voice, or data signals stored by a program in order for each signal processing and control in the controller 170.

Additionally, the storage 140 can perform a function for temporarily store image, voice, or data signals outputted from the external device interface 135 or the network interface 133 and can store information on a predetermined image through a channel memory function.

The storage 140 can store an application or an application list inputted from the external device interface 135 or the network interface 133.

The display device 100 can play content files (for example, video files, still image files, music files, document files, application files, and so on) stored in the storage 140 and provide them to a user.

The user input interface 150 can deliver signals inputted from a user to the controller 170 or deliver signals from the controller 170 to a user. For example, the user input interface 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface 150 can deliver, to the controller 170, control signals inputted from local keys (not shown) such as a power key, a channel key, a volume key, and a setting key.

Image signals that are image-processed in the controller 170 can be inputted to the display 180 and displayed as an image corresponding to corresponding image signals. Additionally, image signals that are image-processed in the controller 170 can be inputted to an external output device through the external device interface 135.

Voice signals processed in the controller 170 can be outputted to the audio output interface 185. Additionally, voice signals processed in the controller 170 can be inputted to an external output device through the external device interface 135.

Besides that, the controller 170 can control overall operations in the display device 100.

Additionally, the controller 170 can control the display device 100 by a user command or internal program inputted through the user input interface 150 and download a desired application or application list into the display device 100 in access to network.

The controller 170 can output channel information selected by a user together with processed image or voice signals through the display 180 or the audio output interface 185.

Additionally, according to an external device image playback command received through the user input interface 150, the controller 170 can output image signals or voice signals of an external device such as a camera or a camcorder, which are inputted through the external device interface 135, through the display 180 or the audio output interface 185.

Moreover, the controller 170 can control the display 180 to display images and control broadcast images inputted through the tuner 131, external input images inputted through the external device interface 135, images inputted through the network interface, or images stored in the storage 140 to be displayed on the display 180. In this case, an image displayed on the display 180 can be a still image or video and also can be a 2D image or a 3D image.

Additionally, the controller 170 can play content stored in the display device 100, received broadcast content, and external input content inputted from the outside, and the content can be in various formats such as broadcast images, external input images, audio files, still images, accessed web screens, and document files.

Moreover, the wireless communication interface 173 can perform a wired or wireless communication with an external electronic device. The wireless communication interface 173 can perform short-range communication with an external device. For this, the wireless communication interface 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication interface 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication interface 173. Accordingly, a user of the wearable device can use the data processed in the display device 100 through the wearable device.

The display 180 can convert image signals, data signals, or OSD signals, which are processed in the controller 170, or images signals or data signals, which are received in the external device interface 135, into R, G, and B signals to generate driving signals.

Furthermore, the display device 100 shown in FIG. 1 is just one embodiment of the present disclosure and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface 133 or the external device interface 135 and play them without including the tuner 131 and the demodulator 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present disclosure described below can be performed by one of the display device described with reference to FIG. 1, an image processing device such as the separated set-top box, and a content playback device including the display 180 and the audio output interface 185.

Figure 2:
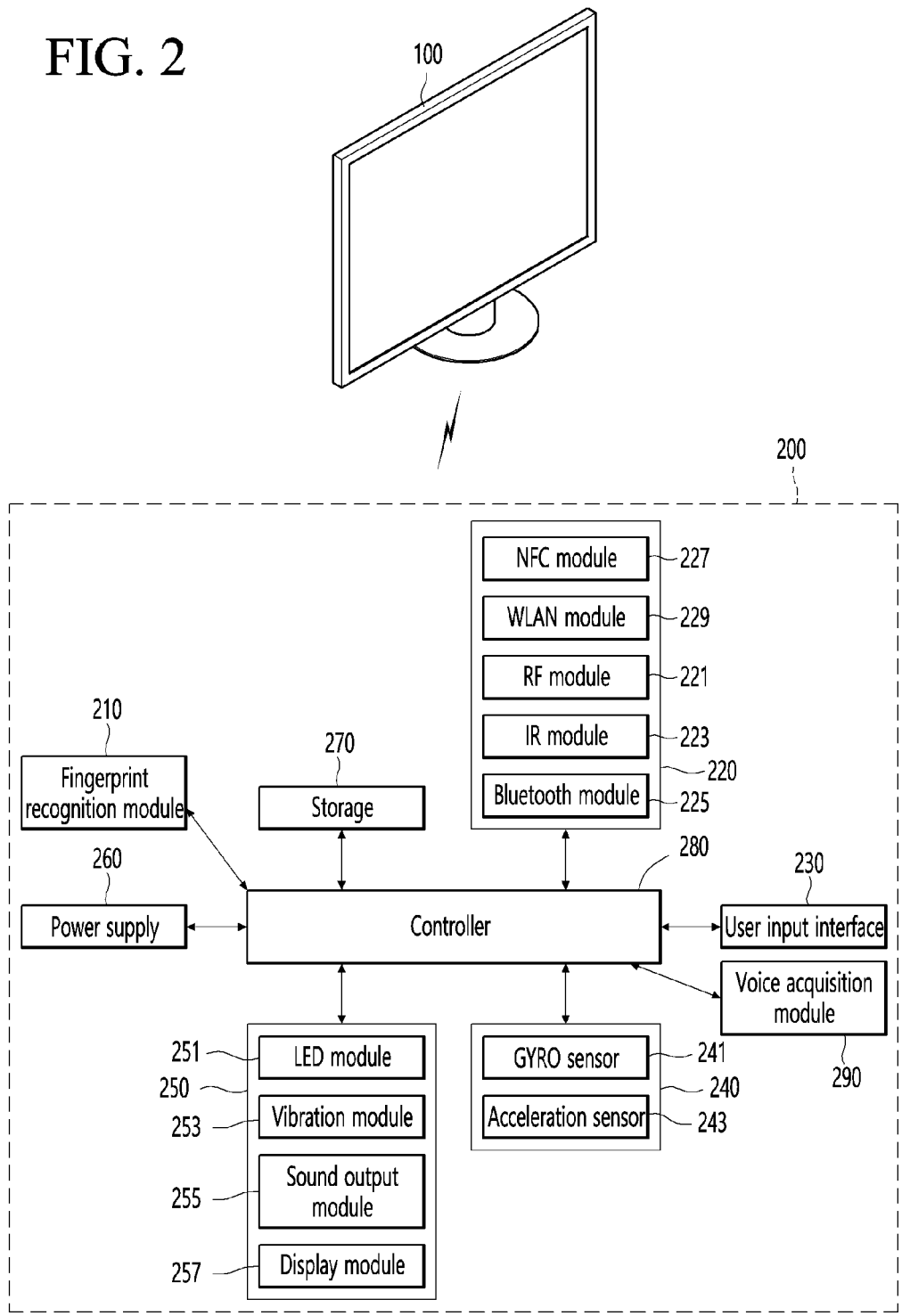
FIG. 2 is a block diagram of a remote control device according to an embodiment of the present disclosure.
Figure 3:
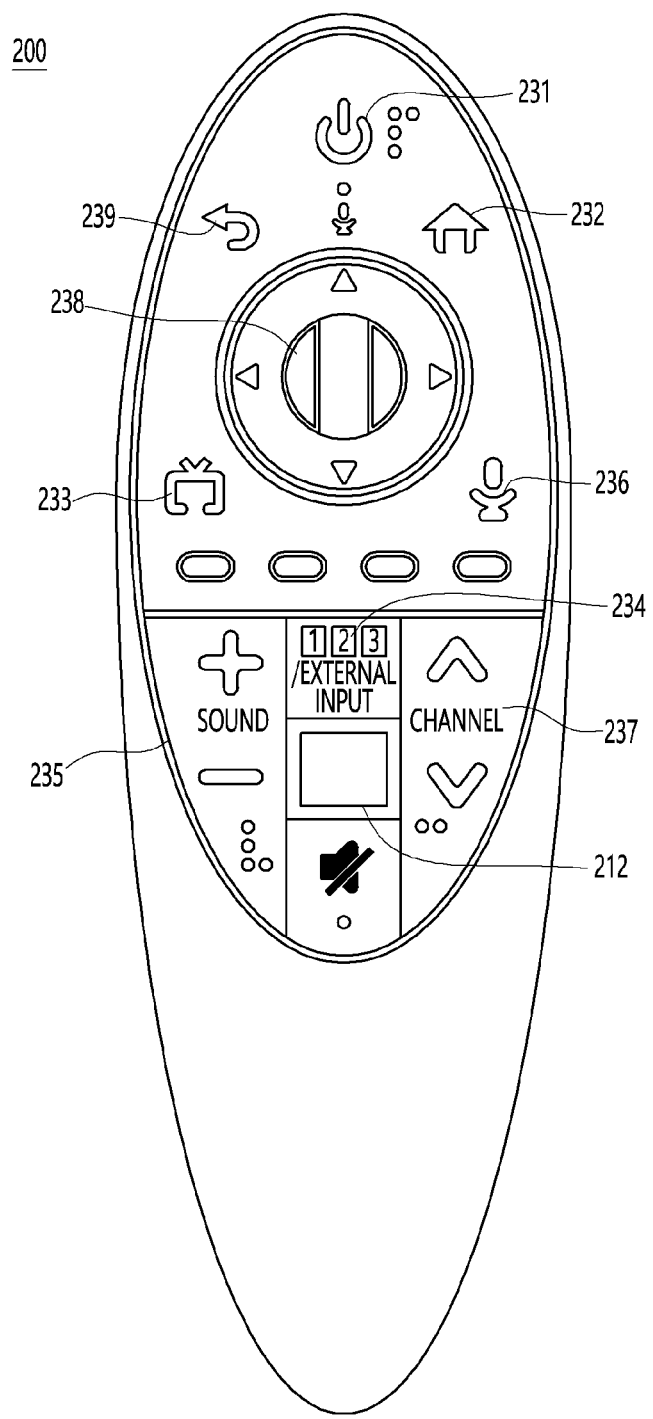
FIG. 3 shows an example of an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 can include a fingerprint recognition module 210, a wireless communication interface 220, a user input interface 230, a sensor 240, an output interface 250, a power supply 260, a storage 270, a controller 280, and a voice acquisition module 290.

Referring to FIG. 2, the wireless communication interface 220 transmits/receives signals to/from an arbitrary any one of display devices according to the above-mentioned embodiments of the present disclosure.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication interface 220.

Moreover, the remote control device 200 can receive signals transmitted from the display device 100 through the RF module 221 and if necessary, can transmit a command on power on/off, channel change, and volume change to the display device 100 through the IR module 223.

The user input interface 230 can be configured with a keypad button, a touch pad, or a touch screen. A user can manipulate the user input interface 230 to input a command relating to the display device 100 to the remote control device 200. If the user input interface 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The power button 231 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume outputted from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input interface 230 includes a touch screen, a user can touch a soft key of the touch screen to input a command relating to the display device 100 to the remote control device 200. Additionally, the user input interface 230 can include various kinds of input means manipulated by a user, for example, a scroll key and a jog key, and this embodiment does not limit the scope of the present disclosure.

The sensor 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display 180 of the display device 100.

The output interface 250 can output image or voice signals corresponding to a manipulation of the user input interface 230 or corresponding to signals transmitted from the display device 100. A user can recognize whether the user input interface 230 is manipulated or the display device 100 is controlled through the output interface 250.

For example, the output interface 250 can include an LED module 251 for flashing, a vibration module 253 for generating vibration, a sound output module 255 for outputting sound, or a display module 257 for outputting an image, if the user input interface 230 is manipulated or signals are transmitted/received to/from the display device 100 through the wireless communication interface 220.

Additionally, the power supply 260 supplies power to the remote control device 200 and if the remote control device 200 does not move for a predetermined time, stops the power supply, so that power waste can be reduced. The power supply 260 can resume the power supply if a predetermined key provided at the remote control device 200 is manipulated.

The storage 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage 270, information on a frequency band for transmitting/receiving signals to/from the display device 100 paired with the remote control device 200 and refer to it.

The controller 280 controls general matters relating to a control of the remote control device 200. The controller 280 can transmit a signal corresponding to a predetermined key manipulation of the user input interface 230 or a signal corresponding to a movement of the remote control device 200 sensed by the sensor 240 to the display device 100 through the wireless communication interface 220.

Additionally, the voice acquisition module 290 of the remote control device 200 can obtain voice.

The voice acquisition module 290 can include at least one microphone 291 and obtain voice through the microphone 291.

Figure 4:
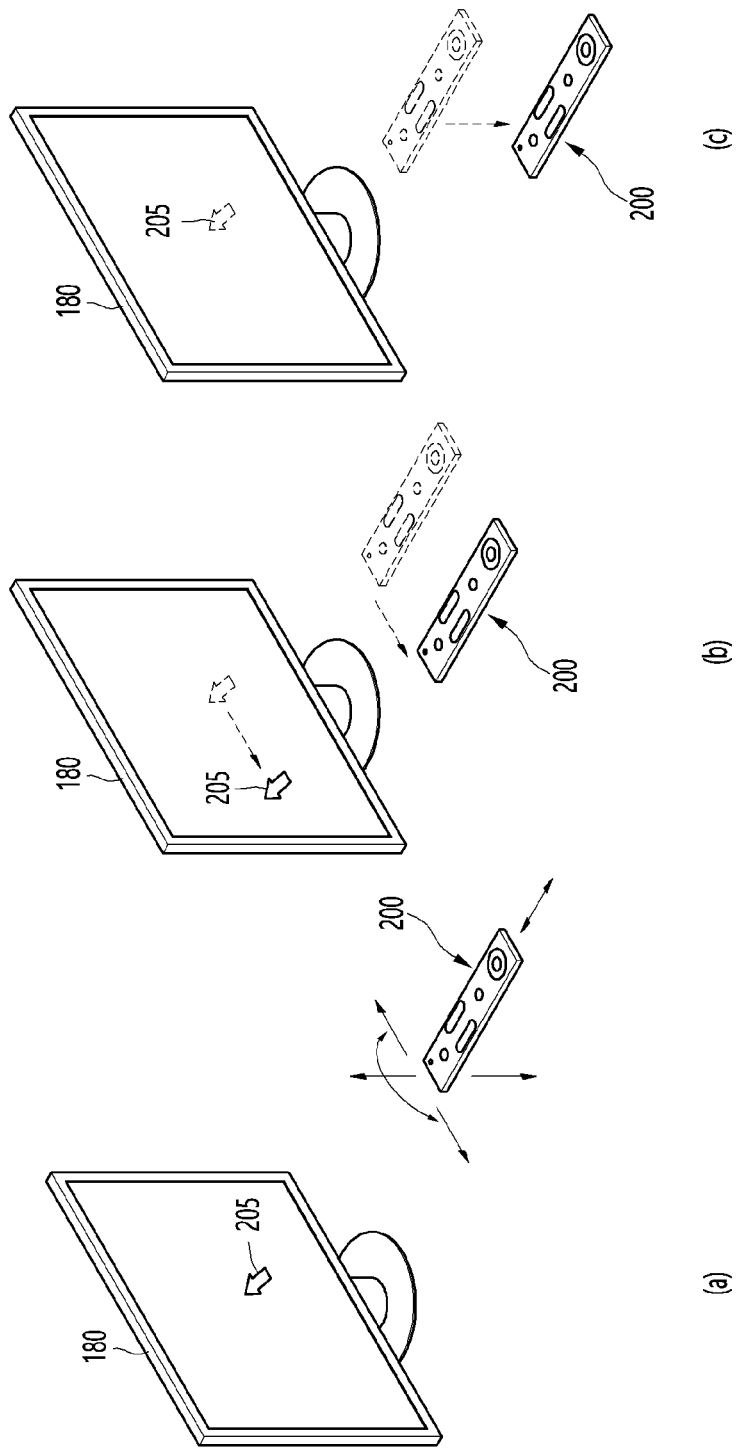
FIG. 4 shows an example of using a remote control device according to an embodiment of the present disclosure.

Then, FIG. 4 is described.

FIG. 4 is a view of utilizing a remote control device according to an embodiment of the present disclosure.

FIG. 4A illustrates that a pointer 205 corresponding to the remote control device 200 is displayed on the display 180.

A user can move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display 180. Thus, a selection area in the display 180 corresponding to the pointer 205 can be zoomed in and displayed largely.

On the other hand, if a user moves the remote control device 200 close to the display 180, a selection area in the display 180 corresponding to the pointer 205 can be zoomed out and displayed reduced.

On the other hand, if the remote control device 200 is away from the display 180, a selection area can be zoomed out and if the remote control device 200 is close to the display 180, a selection area can be zoomed in.

Additionally, if a specific button in the remote control device 200 is pressed, the recognition of a vertical or horizontal movement can be excluded. That is, if the remote control device 200 is moved away from or close to the display 180, the up, down, left, or right movement can not be recognized and only the back and fourth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display 180 and also can be displayed in correspondence to a plurality of points such as a line and a surface.

Figure 5:
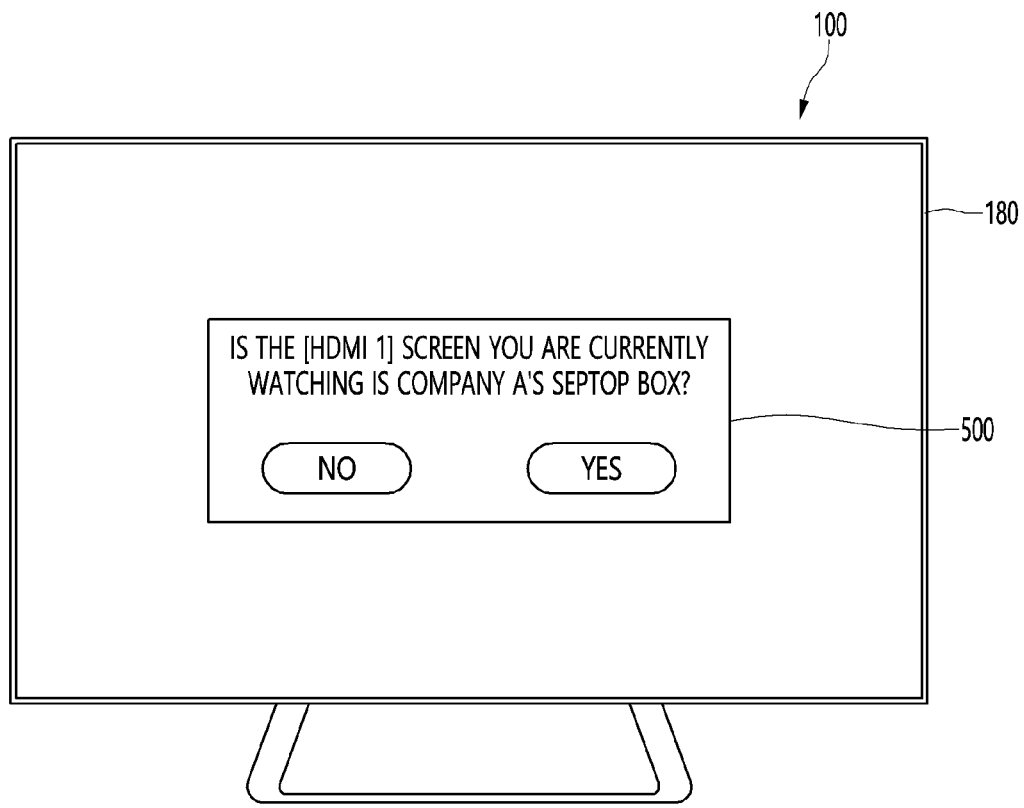
FIG. 5 is an example of a method of recognizing an external device connected to an external input terminal in a conventional display device.

FIG. 5 is an example of a method of recognizing an external device connected to an external input terminal in a conventional display device.

A conventional display device 100 displays an external device confirmation message 500 on the display 180 in order to recognize an external device connected to an external input terminal.

The external device confirmation message 500 may be a message for confirming a type of the external device connected to the external input terminal. As illustrated in the example of FIG. 5, the external device confirmation message 500 may include information on the external input terminal and information on the external device.

The information on the external input terminal may include any one of external input terminals provided in the display device 100. For example, the external input terminals may be HDMI 1, HDMI 2, HDMI 3, USB, component, or the like.

The information on the external device may include a device type (e.g., a set-top box, an OTT box, or a game machine), a manufacturer (e.g., company A or company B).

The conventional display device 100 recognizes the external device connected to the external input terminal by receiving an input on whether the type of the external input terminal and the type of the external device which are being displayed are correct or incorrect through the external device confirmation message 500.

In this case, whenever an external input is switched, it is necessary to ask the user whether a device being currently displayed as the external input is correct, and in this case, the user needs to be asked until the 'Yes' input is received, which may cause user inconvenience. That is, when a device other than the displayed device is connected, the user needs to select 'No' to again display the external device confirmation message 500 in which information on the type of the external input terminal or the external device is changed, and when the user selects 'Yes', the remote control device 200 is automatically set for the corresponding external input, and external input confirmation is terminated, causing user inconvenience in the process of recognizing an external device. In addition, there is a problem that there is a possibility that the user may incorrectly input a yes/no response.

Accordingly, the display device according to an embodiment of the present disclosure automatically recognizes external devices connected to external input terminals respectively. In particular, the present disclosure acquires control information of an external device based on information transmitted from an external router, and recognizes the external device connected to the external device interface 135 based on control information of the external device.

Figure 6:
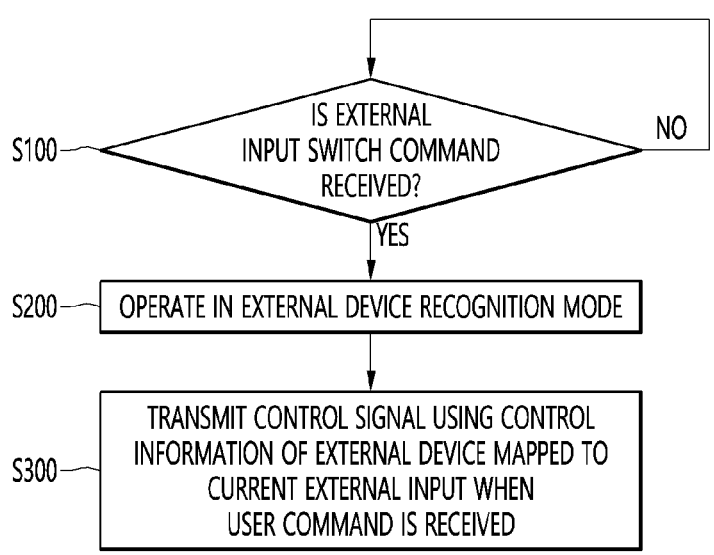
FIG. 6 is a flowchart for a method for operating a display apparatus according to a first embodiment of the present disclosure.

FIG. 6 is a flowchart showing a method of operating a display device according to an embodiment of the present disclosure.

The controller 170 may acquire whether an external input switch command is received (S100).

The controller 170 may receive the external input switch command through the user input interface 150.

The external input switch command may be a command for selecting from which external input terminal an image is to be input.

For example, the display device 100 may include three external input terminals, a first external input terminal of HDMI 1, a second external input terminal of HDMI 2, and a third external input terminal of HDMI 3, but they are merely examples. In this case, the external input switch command may be a command for selecting one of an external device connected to HDMI 1, an external device connected to HDMI 2, and an external device connected to HDMI 3 as a source to which an image is input.

When receiving the external input switch command, the controller 170 may operate in an external device recognition mode (S200).

According to an embodiment, the controller 170 may immediately operate in the external device recognition mode according to an external input switch command.

According to another embodiment, when receiving the external input switch command, the controller 170 may determine whether previously-stored external device mapping information is present, and operate in the external device recognition mode when the previously-stored external device mapping information is not present.

Further, according to another embodiment, unlike FIG. 6, when a new peripheral external device is recognized through an Internet network, the controller 170 may operate in the external device recognition mode.

A method of operating in the external device recognition mode will be described in detail with reference to FIG. 7.

As the controller 170 operates in the external device recognition mode, the controller 170 may perform mapping on the external device connected to the external input terminal, and when receiving a user command, use control information of the external device currently mapped to the external input (S300).

That is, when receiving the user command, the controller 170 may transmit a control signal to the external device based on the control information of the external device currently mapped to the external input.

Here, the user command is a command received from the remote control device 200 through the user input interface 150 and may include, for example, a channel switch key selection command, a volume change key selection command, and the like.

Figure 7:
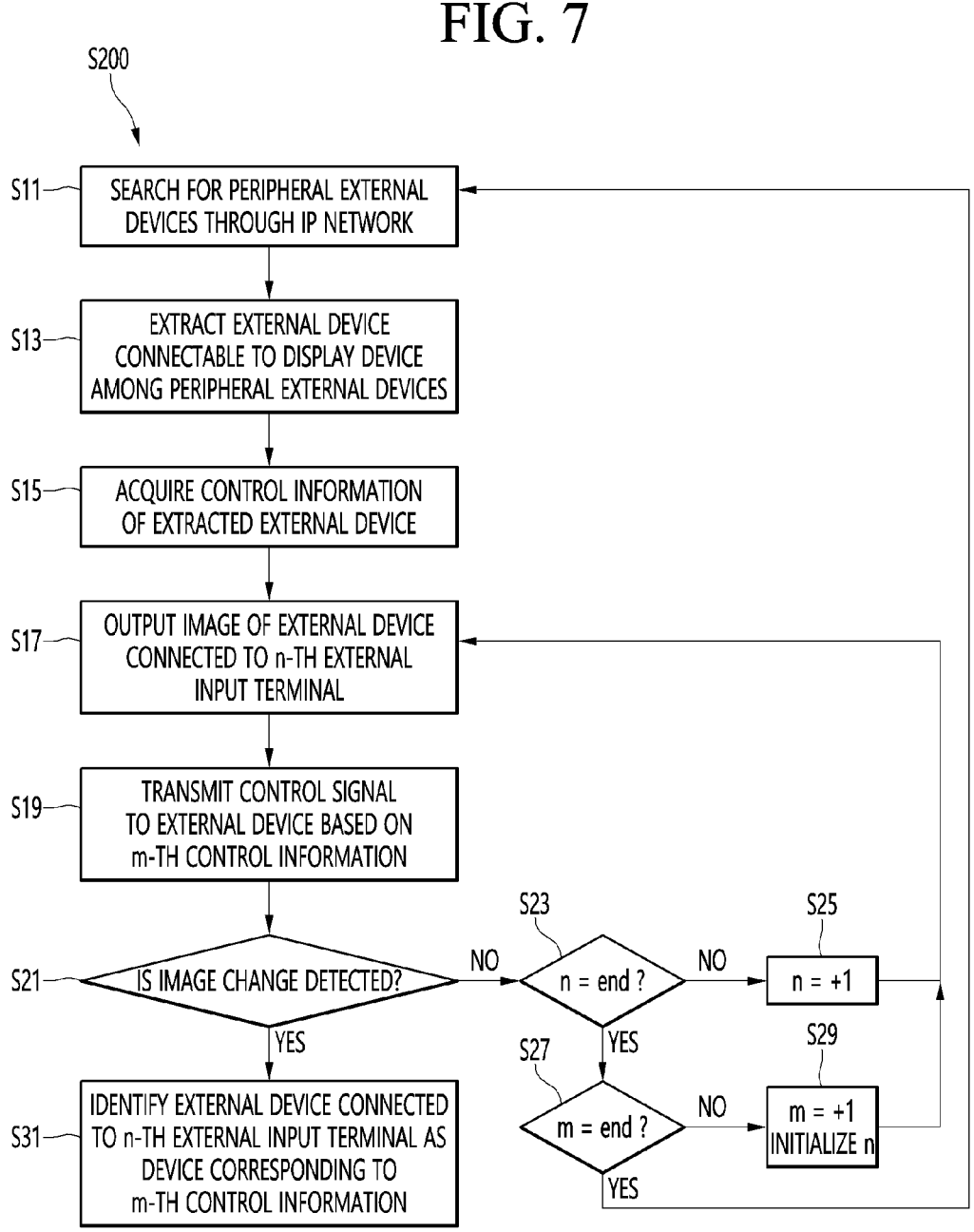
FIG. 7 is a flowchart showing a method of operating in an external device recognition mode in a display device according to an embodiment of the present disclosure.

FIG. 7 is a flowchart showing a method of operating in an external device recognition mode in a display device according to an embodiment of the present disclosure.

FIG. 7 may be a flow chart showing a process in step S200 of FIG. 6.

The controller 170 may search for a peripheral external device through an IP network (S11).

The peripheral external device may mean an external device connected to the same router as the display device 100. Accordingly, the peripheral external device may mean an external device using the same IP as the IP (Internet protocol) used by the display device 100.

Meanwhile, the router is a device that is installed in a space such as an office or home, and allows peripheral devices to use the wireless Internet, and may be an external router.

The controller 170 may search for a peripheral external device through the router, and recognize at least one of peripheral external devices as an external device connected to an external input terminal.

Next, a method of searching for a peripheral external device through an IP network the controller 170 will be described with reference to FIG. 8.

Figure 8:
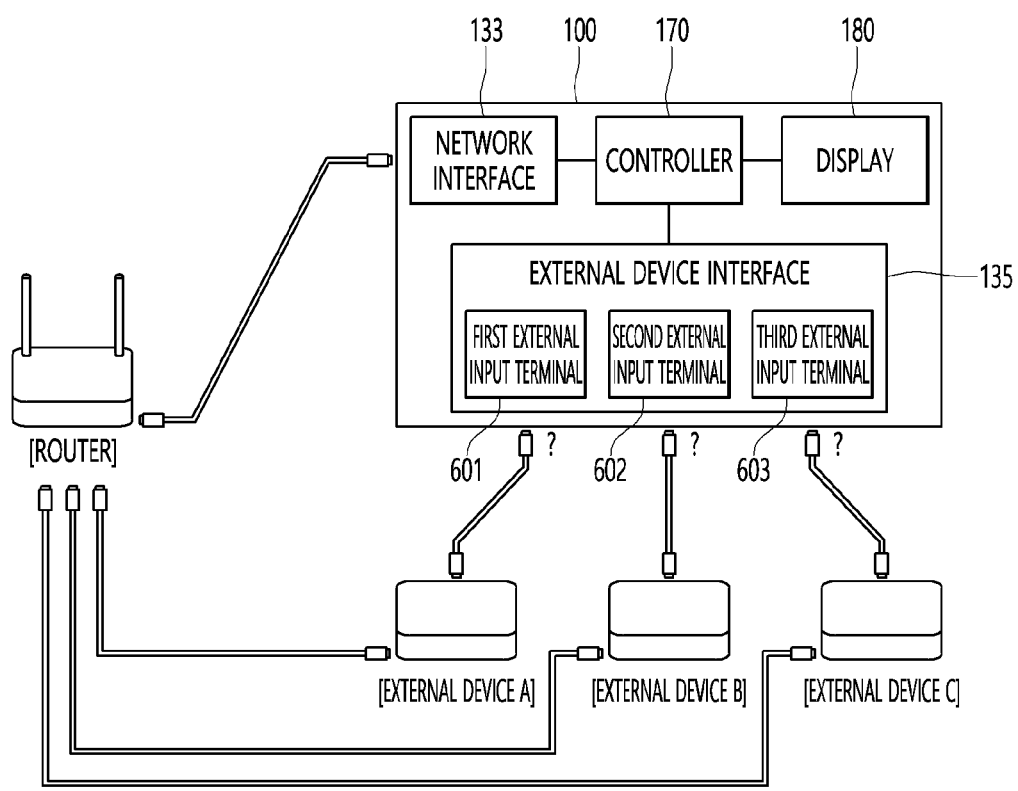
FIG. 8 is an example of a method of searching for a peripheral external device through an Internet network in a display device according to an embodiment of the present disclosure.

FIG. 8 is an example of a method of searching for a peripheral external device through an Internet network in a display device according to an embodiment of the present disclosure.

The network interface 133 may be connected to an Internet network in a wired or wireless manner. For example, the network interface 133 may be connected to a router in a wired or wireless manner, and may be connected to the Internet network.

Meanwhile, not only the display device 100 but also at least one external device may be connected to the router.

In this way, the display device 100 may be connected to the Internet network through the network interface 133, and the controller 170 may search for external devices connected to the same Internet network as the Internet network connected through the network interface 133. The controller 170 may recognize an external device found as being connected to the same Internet network as the Internet network to which the display device 100 is connected, as a peripheral external device.

According to the example of FIG. 8, the controller 170 may search for an external device A, an external device B, and an external device C, and recognize the found external device A, external device B, and external device C as peripheral external devices.

On the other hand, when the controller 170 merely recognizes the peripheral external devices, it is hard for the controller 170 to know which of the peripheral external devices is connected to the external device interface 135 as well as types of the external devices connected to the external input terminals 601, 602, and 603 respectively.

The peripheral external device may be a candidate external device that is assumed to be connected to the display device 100 through an external input terminal.

Referring again to FIG. 7, the method of recognizing the types of the external devices connected to the external input terminals 601, 602, and 603 respectively will be described.

The controller 170 may extract an external device connectable to the display device 100 from among peripheral external devices (S13).

After searching for a peripheral external device, the controller 170 may extract only an external device connectable to the display device 100 from among the found peripheral external devices.

Here, the external device connectable to the display device 100 may mean an electronic device connectable to the display device 100 through an external input terminal provided in the external device interface 135.

Multiple external devices may be connected to the router. For example, not only electronic devices such as the display device 100 and a set-top box, but also electronic devices such as a refrigerator and an air conditioner may be connected to the router.

When the controller 170 recognizes a set-top box or a refrigerator as a peripheral external device, only the set-top box may be extracted as an external device connectable to the display device 100. That is, the controller 170 may not extract the refrigerator or the like as an external device connectable to the display device 100.

That is, the controller 170 may extract an external device connectable to the display device 100 from among peripheral external devices, and recognize at least one of the extracted external devices as an external device connected to the external input terminal. In this case, there is an advantage in that a time required for recognizing the external device can be minimized compared to the case of detecting an image change by acquiring control information for all of the recognized peripheral external devices.

The controller 170 may acquire device information on each of the recognized peripheral external devices, and extract an external device connectable to the display device 100 from among peripheral external devices based on the device information.

The controller 170 may acquire control information of the extracted external device (S15).

Here, the control information may mean a set of wireless communication codes for remotely controlling an external device. That is, the control information is a set of codes for generating a wireless communication signal for controlling an external device, and may mean a codeset. For example, the control information may be a set of IR codes.

The control information may be different depending on a type of external device. That is, the control information may be different depending on types of devices, device manufacturers, and the like. For example, a company A set-top box may operate only with a control signal according to first control information, a company B set-top box may operate only with a control signal according to second control information, and a company C set-top box may operate only with a control signal according to third control information.

In step S13, the controller 170 may extract at least one external device and acquire control information of each of the at least one external device extracted.

According to an embodiment, the storage 140 may store control information for each of types of external devices. That is, the storage 140 may store different control information according to types of external devices. In this case, the controller 170 may acquire control information corresponding to the extracted external device from the storage 140.

According to another embodiment, the controller 170 may receive control information for each of types of external devices from the outside. In this case, the controller 170 may acquire control information by receiving control information corresponding to the extracted external device through wireless communication, based on the type of the extracted external device. The controller 170 may control the network interface 133 to receive control information for remotely controlling an external device connected to an external input terminal from the outside.

However, this is only exemplary, and the controller 170 may acquire control information of an external device extracted in various ways.

Hereinafter, it is assumed that the controller 170 has acquired first to third control information.

The controller 170 may output an image of an external device connected to an n-th external input terminal (S17).

At least one external input terminal may be provided in the display device 100. That is, the display device 100 may include one or a plurality of external input terminals.

When the display device 100 includes only one external input terminal, the controller 170 may control the display 180 to display an image of an external device connected to the one external input terminal.

Meanwhile, when the display device 100 includes a plurality of external input terminals, the controller 170 may control the display 180 to display an image of external devices respectively connected to the plurality of external input terminals.

The controller 170 may initialize n and m to 1 when performing an external device recognition operation. Accordingly, first the controller 170 may control the display 180 to display the image of an external device connected to a first external input terminal.

In addition, the controller 170 may transmit a control signal to the external device based on m-th control information (S19).

That is, the controller 170 may first transmit a first control signal based on the first control information to the external device.

The control signal may include at least one of a channel up/down command, a number key input command, a menu key input command, and a direction key input command.

According to an embodiment, the controller 170 may transmit a control signal to the external device through an Internet network. That is, the controller 170 may transmit the control signal to each of the external devices extracted in step S13 through the Internet network.

According to another embodiment, the display device 100 may include an infrared (IR) blaster, and may transmit the control signal to the external device through the infrared blaster.

The infrared blaster may transmit an IR signal to the external device instead of the remote control device 200 that transmits the IR signal.

After transmitting the control signal, the controller 170 may determine whether the image is changed (S21).

A method of determining whether an image is changed will be described in detail with reference to FIGS. 9 to 13.

Figure 9:
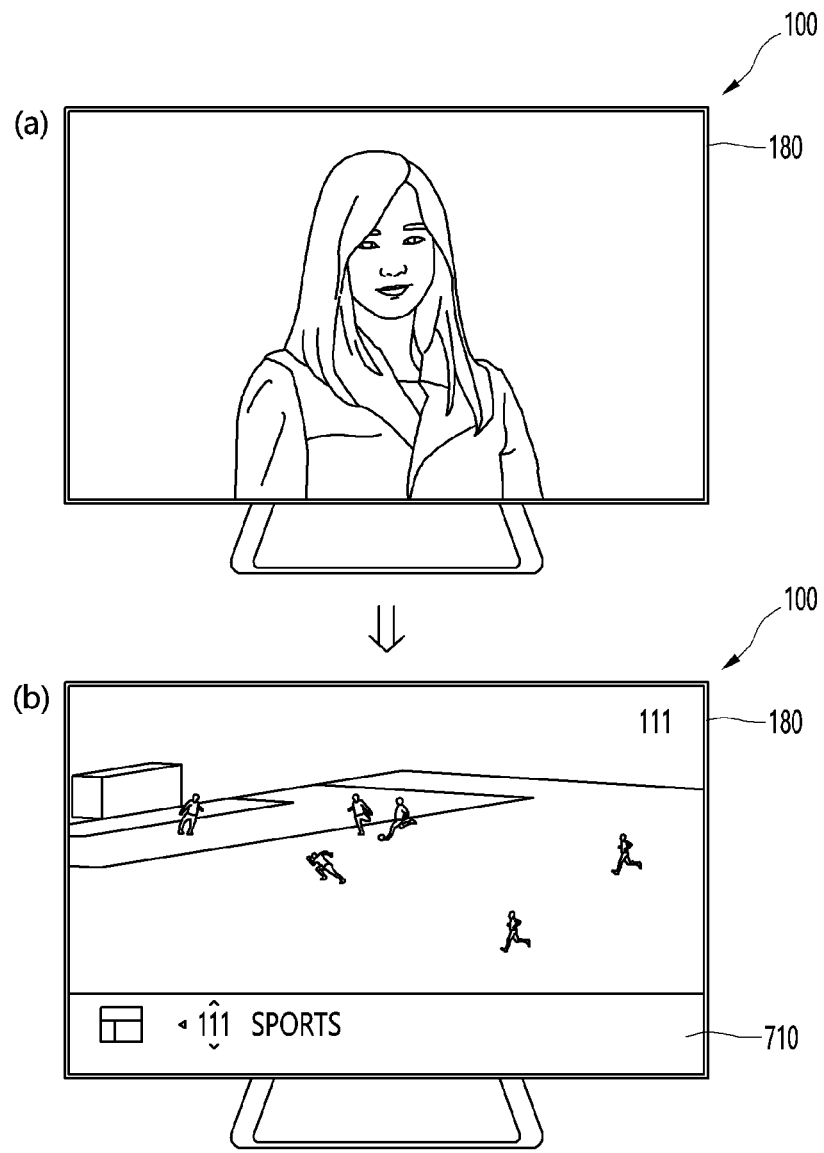
FIG. 9 is an exemplary diagram for describing a first embodiment of a method for determining whether an image is changed in a display device according to an embodiment of the present disclosure.

FIG. 9 is an exemplary diagram for describing a first embodiment of a method for determining whether an image is changed in a display device according to an embodiment of the present disclosure.

According to the first embodiment, after transmitting the control signal including a channel up/down command to an external device, the controller 170 may determine whether an image is changed.

Specifically, as shown in (a) of FIG. 9, in a state in which the display 180 displays an image input from an external device connected to the n-th external input terminal, the controller 170 may transmit a channel up/down command based on m-th control information to the external device.

In this case, when the control information of the external device connected to the n-th external input terminal corresponds to the m-th control information, the channel of the image which is being displayed by the display 180 may be changed by the channel up/down command. However, when the control information of the external device connected to the n-th external input terminal does not correspond to the m-th control information, the channel of the image which is being displayed by the display 180 may not be changed by the channel up/down command.

Accordingly, when a control signal including the channel up/down command is transmitted to the external device, the controller 170 may detect a banner 710 in the image which is being displayed by the display 180. The reason for this is that when the channel is changed, the banner 710 may be displayed for a predetermined time, as shown in FIG. 9B.

When the controller 170 detects the banner 710, the controller 170 may detect that an image change exists, and when the banner 710 is not detected, the controller 170 may detect that the image change does not exist.

Figure 10:
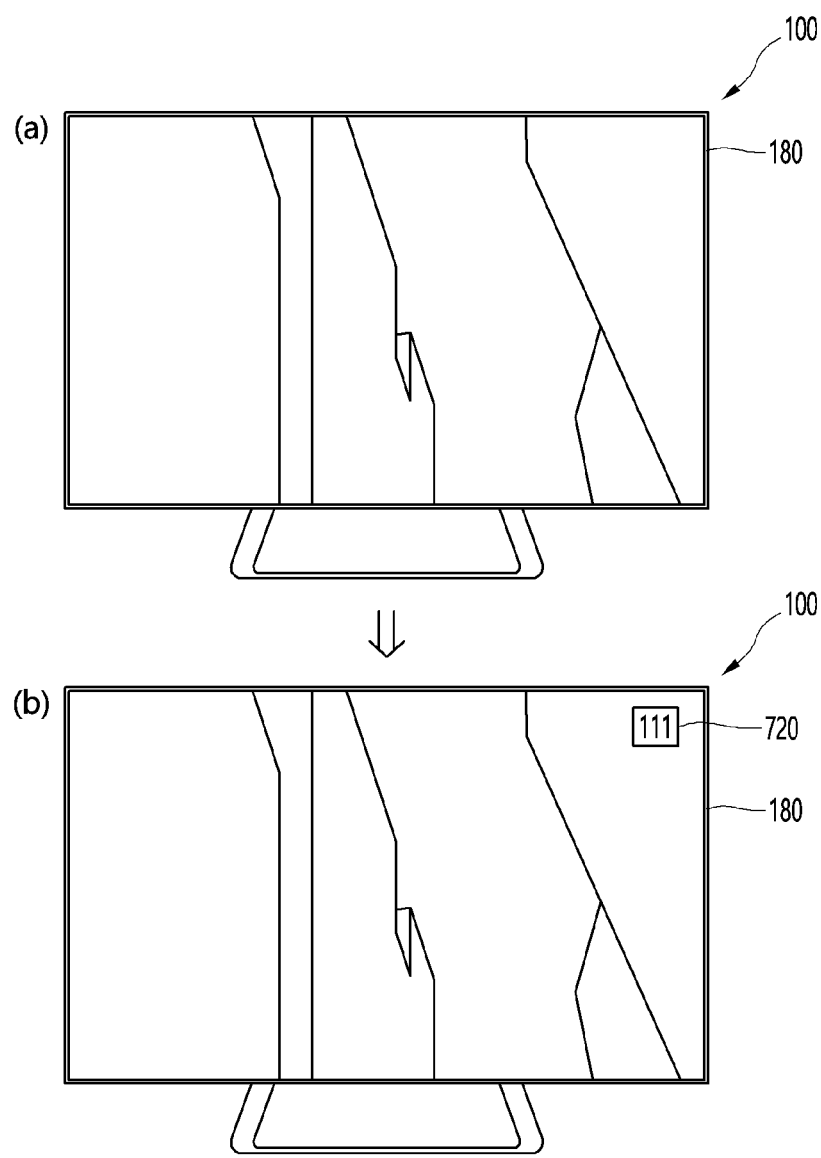
FIG. 10 is an exemplary diagram for describing a second embodiment of a method for determining whether an image is changed in a display device according to an embodiment of the present disclosure.

FIG. 10 is an exemplary diagram for describing a second embodiment of a method for determining whether an image is changed in a display device according to an embodiment of the present disclosure.

According to the second embodiment, after transmitting the control signal including a number key input command to an external device, the controller 170 may determine whether an image is changed.

Specifically, as shown in (a) of FIG. 10, in a state in which the display 180 displays an image input from an external device connected to the n-th external input terminal, the controller 170 may transmit a number key input command based on m-th control information to the external device.

In this case, when the control information of the external device connected to the n-th external input terminal corresponds to the m-th control information, a number may be displayed on an image which is being displayed by the display 180 by the number key input command. However, when the control information of the external device connected to the n-th external input terminal does not correspond to the m-th control information, a number may not be displayed on an image which is being displayed by the display 180 even when the number key input command is received.

Accordingly, when a control signal including the number key input command is transmitted to the external device, the controller 170 may detect a number 720 in the image which is being displayed by the display 180. The reason for this is that, when the number key input command is normally received, the number 720 may be displayed as shown in (b) of FIG. 10.

When the controller 170 detects the number 720, the controller 170 may detect that an image change exists, and when the number 720 is not detected, the controller 170 may detect that the image change does not exist.

Figure 11:
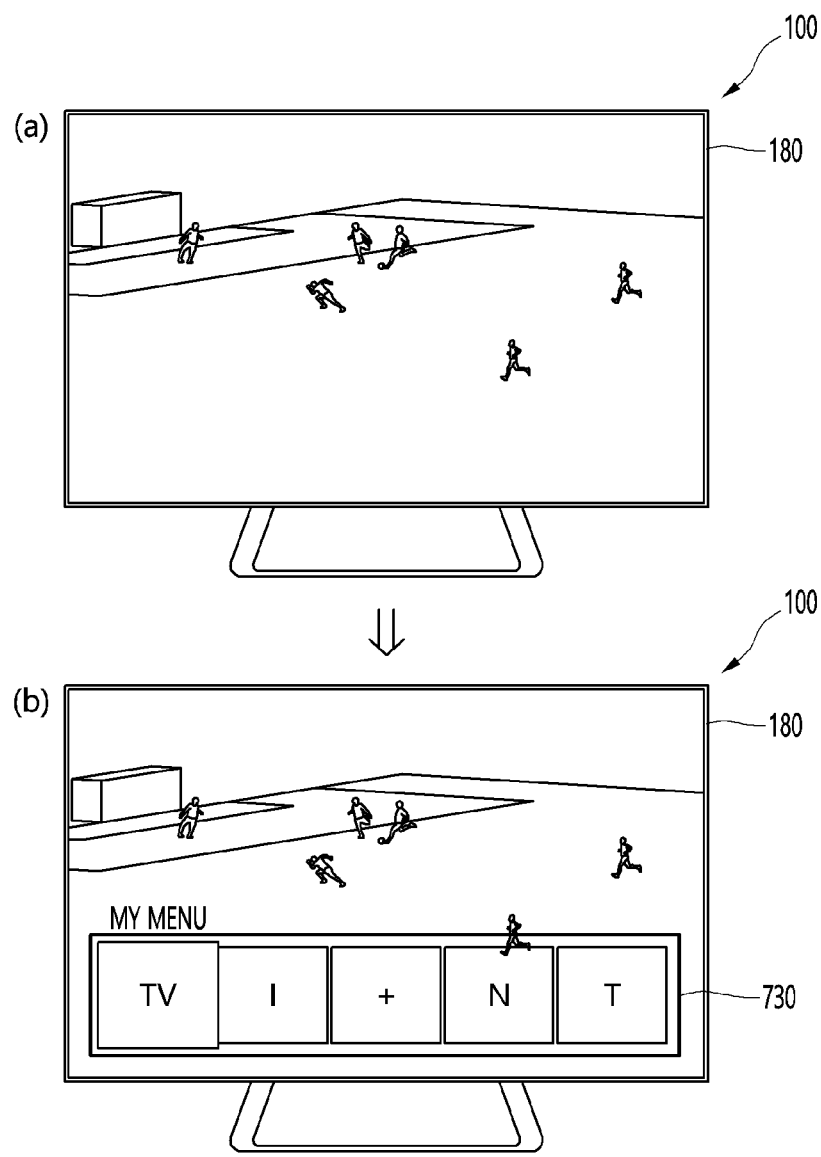
FIG. 11 is an exemplary diagram for describing a third embodiment of a method for determining whether an image is changed in a display device according to an embodiment of the present disclosure.

FIG. 11 is an exemplary diagram for describing a third embodiment of a method for determining whether an image is changed in a display device according to an embodiment of the present disclosure.

According to the third embodiment, after transmitting the control signal including a menu key (or confirmation key) input command to an external device, the controller 170 may determine whether an image is changed.

Specifically, as shown in (a) of FIG. 11, in a state in which the display 180 displays an image input from an external device connected to the n-th external input terminal, the controller 170 may transmit a number key input command based on m-th control information to the external device.

In this case, when the control information of the external device connected to the n-th external input terminal corresponds to the m-th control information, a menu 730 may be displayed on an image which is being displayed by the display 180 by the menu key (or confirmation key) input command. However, when the control information of the external device connected to the n-th external input terminal does not correspond to the m-th control information, the menu 730 may not be displayed on an image which is being displayed by the display 180 even when the number key input command is received.

Accordingly, when a control signal including the menu key (or confirmation key) input command is transmitted to the external device, the controller 170 may detect a number 720 in the image which is being displayed by the display 180. The reason for this is that the menu key (or confirmation key) input command is normally received, the menu 720 may be displayed as shown in (b) of FIG. 11.

When the controller 170 detects the menu 730, the controller 170 may detect that an image change exists, and when the menu 730 is not detected, the controller 170 may detect that the image change does not exist.

Figure 12:
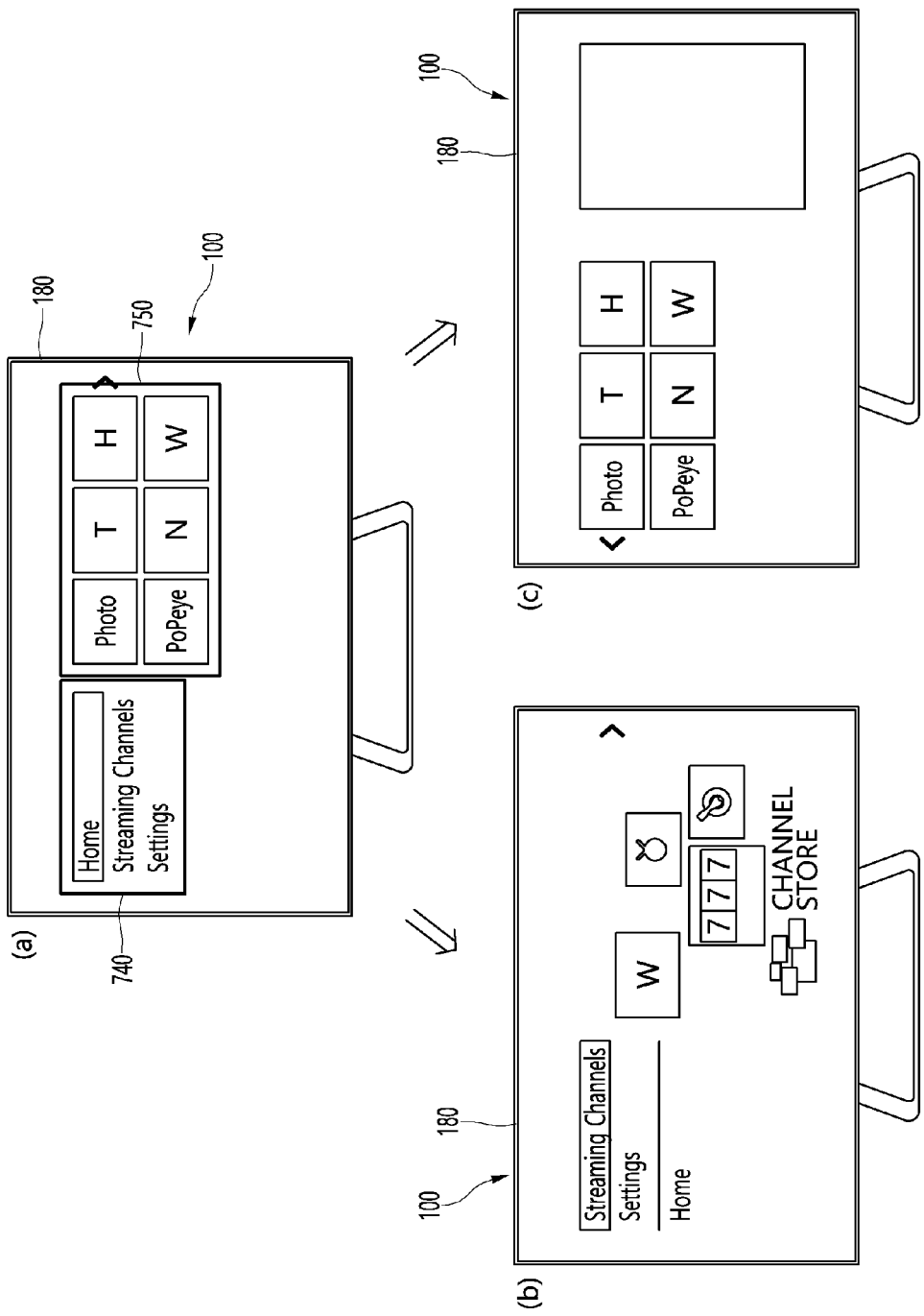
FIGS. 12 and 13 are exemplary diagrams for describing a fourth embodiment of a method for determining whether an image is changed in a display device according to an embodiment of the present disclosure.
Figure 13:
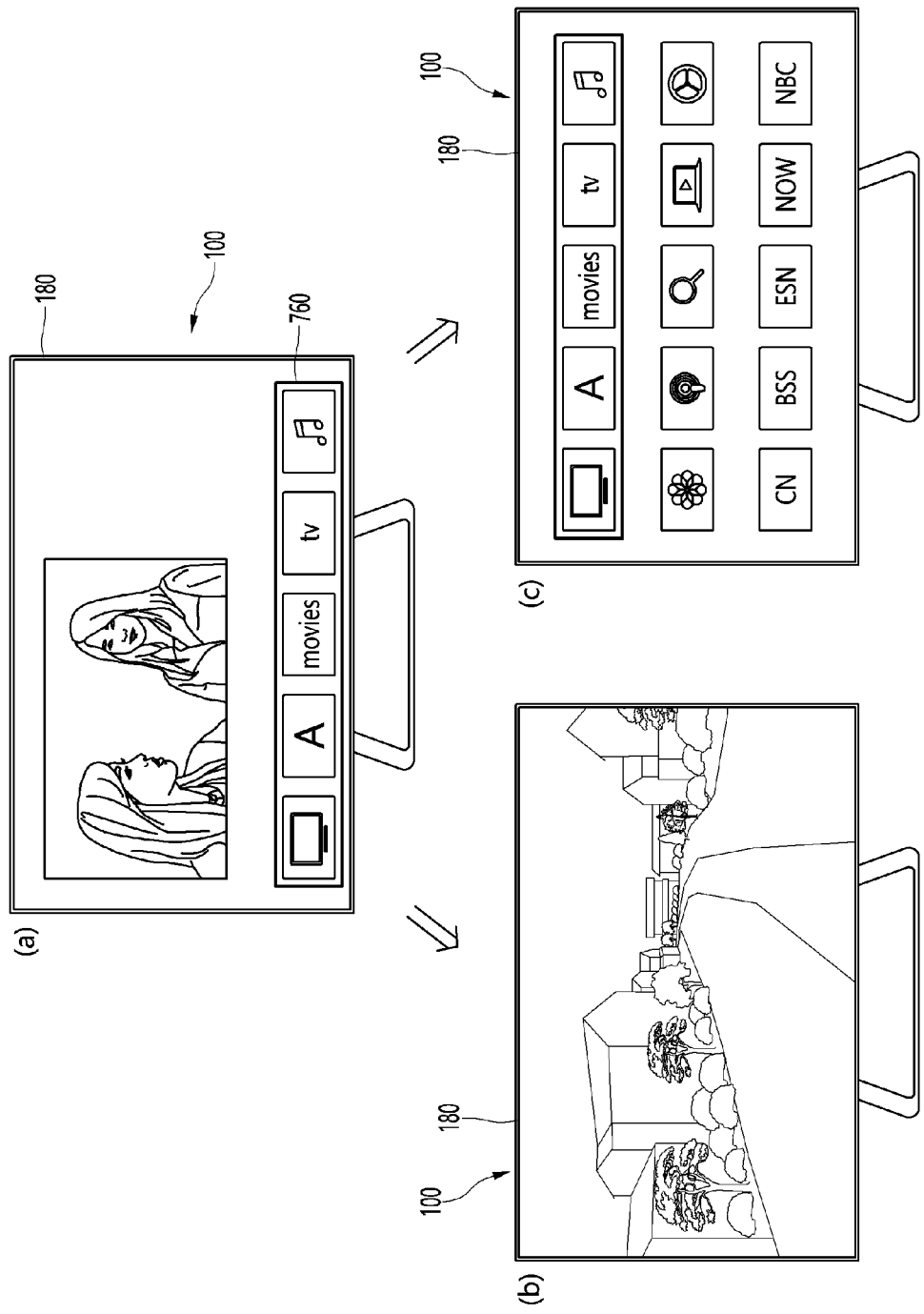

FIGS. 12 and 13 are exemplary diagrams for describing a fourth embodiment of a method for determining whether an image is changed in a display device according to an embodiment of the present disclosure.

According to the fourth embodiment, the controller 170 may determine whether an image is changed while transmitting at least two control signals.

For example, the controller 170 may determine whether an image is changed while sequentially transmitting a control signal including a menu key (or confirmation key) input command and a control signal including a direction key input command to an external device.

When the control information of the external device connected to the n-th external input terminal corresponds to the m-th control information, a screen change, such as the display of the menu 730 may occur on the display 180 due to the menu key (or confirmation key) input command and the direction key input command. For example, after a first menu 740 and a second menu 750 as shown in (a) of FIG. 12 are displayed on the display 180 according to the menu key (or a confirmation key) input command, a screen change may occur such as a position of an indicator on the first menu 740 is changed according to the direction key input command as shown in (b) of FIG. 12, or a position of the second menu 750 is changed according to the second direction key input command as shown in (c) of FIG. 12.

However, when the control information of the external device connected to the n-th external input terminal does not correspond to the m-th control information, a change may not occur on the screen which is being displayed by the display 180 even through the menu key (or confirmation key) input command and the direction key input command are received.

Accordingly, the controller 170 may determine whether or not the image has changed by comparing an image after transmitting the menu key (or confirmation key) input command, and an image after transmitting the direction key input command. When there is a change between the image after transmitting the menu key (or confirmation key) input command, and the image after transmitting the direction key input command, the controller 170 may detect that an image change exists, and when there is no change between the image after transmitting the menu key (or confirmation key) input command, and the image after transmitting the direction key input command, the controller 170 may detect that an image change does not exist.

As another example, the controller 170 may determine whether an image change occurs while sequentially transmitting a control signal including a direction key input command or a menu key (or confirmation key) input command to the external device after transmitting the control signal including a menu key (or confirmation key) input command.

When the control information of the external device connected to the n-th external input terminal corresponds to the m-th control information, a change may occur in the screen being displayed by the display 180 due to the next menu key (or confirmation key) input command or the direction key input command after the menu key (or confirmation key) input command is transmitted. For example, after the summary menu 760 as shown in (a) of FIG. 13 is displayed on the display 180 by a menu key (or confirmation key) input command, a screen change may occur such as the summary menu 760 disappears by the menu key (or confirmation key) input command as shown in (b) of FIG. 13 and an image is displayed, or an extension menu is displayed as shown in (c) of FIG. 13 by the direction key input command.

However, when the control information of the external device connected to the n-th external input terminal does not correspond to the m-th control information, a change may not occur on the screen which is being displayed by the display 180 even through the menu key (or confirmation key) input command or the direction key input command are received after the menu key (or confirmation key) input command.

Accordingly, the controller 170 may determine whether or not the image has changed by comparing an image after transmitting the menu key (or confirmation key) input command, and an image after transmitting the menu key (or confirmation key) input command or the direction key input command.

As in the fourth embodiment, when it is determined whether an image change occurs while transmitting at least two control signals, the accuracy of external device mapping may be improved than a case where it is determined whether an image change occurs with one control signal. For example, even though the control information of the external device connected to the n-th external input terminal does not correspond to the m-th control information, it is possible to minimize the mapping of the n-th external input terminal and the m-th control information due to an unintended image change or an image change due to an error.

On the other hand, even though the types of external devices are different, an image change may occur by the direction key input command after the menu key (or confirmation key) input command. In this case, the controller 170 may store a pattern of image change according to the direction key input command after the menu key (or confirmation key) input command for each type of an external device, and recognize the type of the external device based on the stored the pattern of the image change.

For example, the storage may store a pattern in which a change occurs as shown in (a) and (b) of FIG. 12 when the first external device receives a direction key input command after a menu key (or confirmation key) input command and a pattern in which a change occurs as shown in (a) and (b) of FIG. 13 when the second external device receives a direction key input command after a menu key (or confirmation key) input command. When detecting an image change, the controller 170 may sequentially transmit the menu key (or confirmation key) input command and the direction key input command, and then recognize a type of the external device based on a image change pattern.

In addition, the controller 170 may determine a control signal according to a type of the external device after acquiring the type of the external device through the control information. For example, when the control information is control information of a set-top box, the controller 170 may detect an image change in the method described with reference to FIG. 9 or 10, and when the control information is control information of an OTT box, the controller 170 may detect an image change in the same method as described with reference to FIG. 12 or 13.

That is, although the embodiments have been individually described with reference to FIGS. 9 to 13, the controller 170 may detect the image change by performing at least one of the embodiments of FIGS. 9 to 13 according to the type of external device or the like when detecting the image change.

Again, details will be described with reference to FIG. 7.

When an image change is not detected after transmitting the control signal, the controller 170 may determine whether n is the end (S23).

The controller 170 may set the end of n to the number of external input terminals provided in the display device 100. For example, when the display device 100 includes three external input terminals, the controller 170 may set n to 3.

That is, in step S23, the controller 170 may determine whether an image change detection operation has been performed on all of the external input terminals provided in the display device 100.

When n is not the end, the controller 170 may increase n by 1 (S25).

That is, the controller 170 may perform control to output an image of an external device connected to the next external input terminal when it is determined that an image change detection operation has not been performed on all of the external input terminals provided in the display device 100.

Accordingly, the controller 170 may transmit, to the external device, a first control signal based on first control information while performing control to output an image of an external device connected to the first external input terminal, and when an image change is not detected, perform control to output an image of an external device connected to a second external input terminal. In addition, the controller 170 may transmit, to the external device, the first control signal based on the first control information while performing control to output an image of an external device connected to the second external input terminal, and when an image change is not detected, perform control to output an image of an external device connected to a third external input terminal. In addition, the controller 170 may transmit, to the external device, the first control signal based on the first control information while performing control to output an image of an external device connected to the third external input terminal, and detect whether an image change occurs.

On the other hand, In addition, the controller 170 may determine whether n is the end, and when n is the end, determine whether m is the end, in a case where an image change is not detected after transmitting, to the external device, the first control signal based on the first control information while performing control to output an image of an external device connected to the third external input terminal.

That is, when n is the end in step S23, the controller 170 may determine whether m is the end (S27).

The controller 170 may set the end of m to the number of pieces of control information acquired in step S15. Alternatively, the controller 170 may set the end of m to the number of external devices extracted in step S13. For example, the controller 170 may acquire three pieces of control information or set m to 3 when three external devices are extracted.

That is, in step S27, the controller 170 may determine whether the image change detection operation has been performed using all of the received control information.

When m is not the end, the controller 170 may increase m by 1 and initialize n (S29).

That is, when an image change does not occur although the control signal is transmitted to external devices connected to all external input terminals using the m-th control information, the controller 170 may perform control to transmit a control signal based on the next control information. The controller 170 may increase m by 1 to transmit a control signal based on the next control information, and initialize n when increasing m by 1.

That is, the controller 170 may detect a change in an image received through each of the first to third external input terminals while transmitting the second control signal based on the second control information when an image change is detected in the image received through each of the first to third external input terminals while transmitting the first control signal based on the first control information but the image change does not occur. Similarly, the controller 170 may detect a change in an image received through each of the first to third external input terminals while transmitting the third control signal based on the third control information when an image change is detected in the image received through each of the first to third external input terminals while transmitting the second control signal based on the second control information but the image change does not occur.

When it is determined that m is the end, the controller 170 may return to step S11. That is, when m is the last, the controller 170 may search for a peripheral external device again through the IP network.

Meanwhile, when the controller 170 detects an image change, the controller 170 may identify the external device connected to the n-th external input terminal as a device corresponding to the m-th control information (S31).

When the image change is detected, the controller 170 may identify the external device connected to the n-th external input terminal at a time point when the image change is detected as a device corresponding to the m-th control information, and then store external device mapping information based on identification information.

For example, the controller 170 may store, in the storage 140, external device mapping information in which an external device connected to the first external input terminal is mapped to a device corresponding to first control information when an image change is detected in an output image after the first control signal based on the first control information is transmitted in a state in which an image connected to the first external input terminal is being output, an external device connected to the second external input terminal is mapped to a device corresponding to second control information when an image change is detected in an output image after the second control signal based on the second control information is transmitted in a state in which an image connected to the second external input terminal is being output, and an external device connected to the third external input terminal is mapped to a device corresponding to third control information when an image change is detected in an output image after the third control signal based on the third control information is transmitted in a state in which an image connected to the third external input terminal is being output.

In FIG. 7, the description is made on the assumption that the end of n is 3 and the end of m is 3, but this is only an example for convenience of description, and the present disclosure is not limited thereto.

Figure 14:
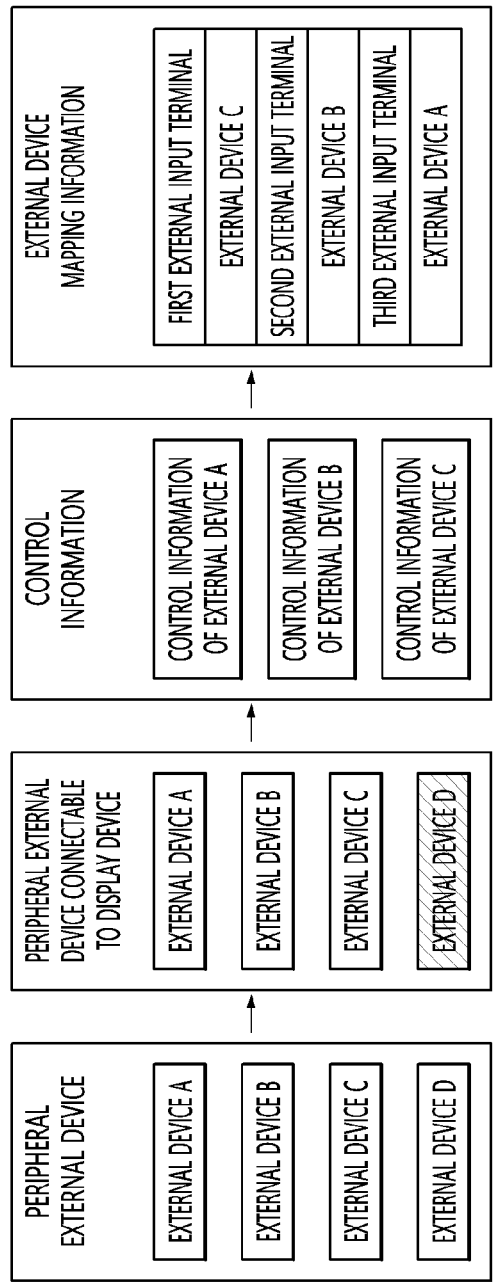
FIG. 14 is a schematic diagram illustrating a method of storing external device mapping information as the display device operates in an external device recognition mode according to an embodiment of the present disclosure.

Next, FIG. 14 is a schematic diagram illustrating a method of storing external device mapping information as the display device operates in an external device recognition mode according to an embodiment of the present disclosure.

Referring to the example shown in FIG. 14, the controller 170 may search for external devices A, B, C, and D as peripheral external devices through an Internet network.

In addition, the controller 170 may extract the external device A, the external device B, and the external device C among the external devices A, B, C, and D, as peripheral external devices capable of connecting to the display device 100.

The controller 170 may acquire control information of the extracted external device. That is, the controller 170 may acquire control information of the external device A, control information of the external device B, and control information of the external device C.

The controller 170 may map the first external input terminal to the external device C, the second external input terminal to the external device B, and the third external input terminal to the external device A and store, in the storage 140, mapping information in which the external devices are mapped to the external input terminals by detecting a change in an image input through each of the first external terminal, the second external terminal and the third external input terminal using control information of the external device A, control information of the external device B, and control information of the external device C.

Specifically, the controller 170 may output an image received through a first external input terminal among the plurality of external input terminals, transmit a first control signal based on first control information among the plurality of control information to an external device, and when a change in the output image is detected by the control signal, and recognize the external device connected to the first external input terminal as a first external device corresponding to the first control information. In addition, the controller 170 may recognize the external device connected to the first external input terminal as the first external device corresponding to the first control information, output an image received through the second external input terminal among the plurality of external input terminals, transmit a second control signal based on second control information among the plurality of control information, and when a change in the output image is detected by the control signal, and recognize the external device connected to the second external input terminal as a second external device corresponding to the second control information. On the other hand, the controller 170 may transmit a second control signal based on second control information to an external device when the change in the output image is not detected by the first control signal, and recognize an external device connected to the first external input terminal as a second external device corresponding to the second control information when a change in the output image is detected by the second control signal.

In this way, the controller 170 may store external device mapping information in the storage 140 by recognizing the external device A, the external device B, and the external device C at the first to third external input terminals.

After the mapping information is stored, the controller 170 may identify a current external input when receiving a user command. The current external input may mean an external input terminal through which an image currently being displayed by the display 180 is input. The controller 170 may detect an external device mapped to the current external input from the mapping information stored in the storage 140, generate a control signal according to a user command using the control information of the mapped external device, and transmit the control signal to the external device.

As described above, according to an embodiment of the present disclosure, there is an advantage that the user does not have to manually input the external device since the types of the external devices connected to the external input terminals can be automatically recognized.

Meanwhile, when the controller 170 detects an image change, the controller 170 may control the display 180 to output a preset guide image on an image input from the external device.

Figure 15:
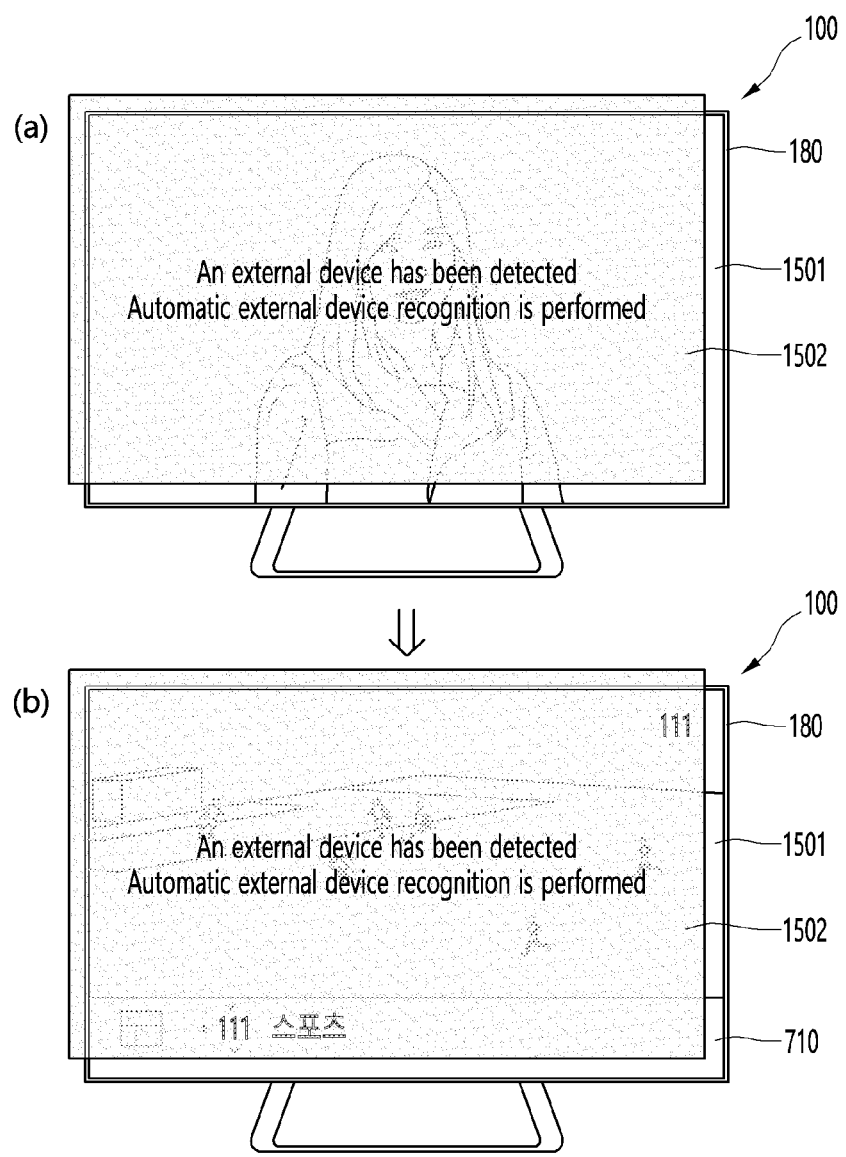
FIG. 15 is an exemplary diagram of a method of displaying a guide image when an image change is detected in a display device according to an embodiment of the present disclosure.

FIG. 15 is an exemplary diagram of a method of displaying a guide image when an image change is detected in a display device according to an embodiment of the present disclosure.

The controller 170 may control the display 180 to output an image of an external device in order to detect an image change.

For example, when the controller 170 outputs an image of the external device to detect an image change, an image as shown in FIGS. 9 to 13 may be displayed on the display 180, and a change may occur in the image displayed on the display 180 due to the control signal. However, since the change in the image is not caused by a user command, the user may mistake the change for a failure of the display device 100 when the user sees the change in the image.

Accordingly, when the controller 170 outputs an image 1501 of the external device, the controller 170 may control the display 180 to display a preset guide image 1502 on the image of the external device. The controller 170 may display the image 1501 of the external device on a first image layer and a guide image 1502 on a second image layer, and control the display 180 such that the second image layer is positioned on the first image layer. That is, the controller 170 may display the guide image 1502 by overlapping the guide image 1502 on the image 1501 of the external device.

The guide image 1502 may be a black image for covering the first image layer. The guide image 1502 may include a message for guiding that the display device is currently operating in the external device recognition mode. For example, a message 'An external device has been detected. Automatic external device recognition is performed' may be provided but is only exemplary, and is not limited thereto.

Meanwhile, when an image change occurs such as the banner 710 is generated by the control signal, the banner 710 may be located in the first image layer. Accordingly, the controller 170 may recognize an external device by detecting a change in an image displayed on the first image layer.

Since the user cannot see the image on the first image layer and only sees the guide image 1502 on the second image layer, it is possible to inform the user that the display device 100 is currently recognizing an external device.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to illustrate the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

What is claimed is:

1. A display device comprising:
   a display;
   an external device interface;
   a network interface;
   a memory configured to store a plurality of control information for types of external devices; and
   a controller configured to:
   cause the display to display an image received from a connected external device via an external input terminal of the external device interface, wherein a type of the connected external device is unknown at the display device;
   transmit a control signal to the connected external device according to one control information of the plurality of control information;
   detect a change in the displayed image in response to the transmitted control signal according to the one control information; and identify a type of the connected external device as a specific device type corresponding to the one control information based on detection of the change in the displayed image.

2. The display device of claim 1, wherein the controller is further configured to:
search for peripheral external devices via the network interface; and
detect one or more peripheral external devices connectable to an external input terminal provided in the external device interface among the searched peripheral external devices.

3. The display device of claim 2, wherein the controller is further configured to recognize at least one of the detected peripheral external devices as being connected to the display device.

4. The display device of claim 1, wherein the controller is further configured to receive, from an external source via the network interface, control information for remotely controlling the connected external device.

5. The display device of claim 1, wherein:
the external device interface includes a plurality of external input terminals; and
wherein the controller is configured to:
cause the display to display a first image received via a first external input terminal among the plurality of external input terminals;
transmit, to a first external device connected via the first external input terminal of the plurality of external input terminals, a first control signal based on first control information among the plurality of control information stored in the memory;
identify a type of the first external device as a first device type corresponding to the first control information based on detecting a change in the displayed first image in response to the first control signal;
transmit, to the first external device, a second control signal based on second control information among the plurality of control information stored in the memory based on not detecting a change in the displayed image in response to the first control signal; and
identify the type of the first external device as a second device type corresponding to the second control information based on detecting a change in the displayed first image in response to the second control signal.

6. The display device of claim 1, wherein the controller is further configured to display a preset guide image overlapping with the displayed image based on detecting the change in the displayed image in response to the transmitted control signal.

7. The display device of claim 1, wherein the transmitted control signal includes at least one of a channel up/down command, a number key input command, a menu key input command, or a direction key input command.

8. The display device of claim 1, wherein the memory stores different image change patterns according to types of external devices, and
wherein the controller is further configured to sequentially transmit two or more control signals to the connected external device, and identify the connected external device based on a comparison of an image change of the displayed image with each image change pattern corresponding to the transmitted two or more control signals.

9. The display device of claim 1, further comprising:
an infrared (IR) blaster configured to transmit the control signal to the connected external device via IR.

10. The display device of claim 1, wherein the controller is further configured to transmit the control signal to the connected external device through an Internet network.

11. The display device of claim 1, wherein the memory includes external device mapping information that maps the external input terminal to the connected external device connected to the external input terminal, and
wherein the controller is further configured to generate a particular control signal using the control information of the connected external device based on the external device mapping information in response to receiving a user command.

* * * * *